US012694456B2

(12) United States Patent
Herman et al.

(10) Patent No.: US 12,694,456 B2
(45) Date of Patent: Jul. 28, 2026

(54) AUTOMATIC GENERATION OF OPTIMIZED AGGREGATION METRICS FOR USAGE BASED INSURANCE

(71) Applicant: Ford Global Technologies, LLC, Dearborn, MI (US)

(72) Inventors: David Michael Herman, West Bloomfield, MI (US); Anuj Pal, Minneapolis, MN (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 18/439,219

(22) Filed: Feb. 12, 2024

(65) Prior Publication Data

US 2025/0259243 A1      Aug. 14, 2025

(51) Int. Cl.
*G06Q 40/08*          (2012.01)
*G06N 20/00*          (2019.01)

(52) U.S. Cl.
CPC ......... *G06Q 40/0842* (2025.08); *G06N 20/00* (2019.01); *G06Q 40/0822* (2025.08); *G06Q 40/08221* (2025.08)

(58) Field of Classification Search
CPC ............... G06Q 40/08; G06Q 40/0822; G06Q 40/08221; G06Q 40/0842; G06N 20/00
See application file for complete search history.

(56) References Cited

U.S. PATENT DOCUMENTS

| | | | |
|---|---|---|---|
| 10,817,950 B1 | 10/2020 | Iqbal et al. | |
| 10,825,095 B1 | 11/2020 | Bernico et al. | |
| 11,367,142 B1 | 6/2022 | Wang et al. | |
| 11,373,249 B1 | 6/2022 | Hayward et al. | |
| 11,393,039 B2 | 7/2022 | Khalak et al. | |
| 11,443,360 B2 | 9/2022 | Walters et al. | |
| 12,002,305 B1 * | 6/2024 | Gross ................. | G06Q 30/0206 |
| 2015/0294422 A1 | 10/2015 | Carver et al. | |
| 2019/0188212 A1 * | 6/2019 | Miller ................... | H04L 63/145 |
| 2019/0333636 A1 * | 10/2019 | Bennett ................. | G16H 50/00 |
| 2021/0256616 A1 | 8/2021 | Hayward et al. | |
| 2022/0036194 A1 | 2/2022 | Sundaresan et al. | |

(Continued)

FOREIGN PATENT DOCUMENTS

CN          114722945 A      7/2022

OTHER PUBLICATIONS

Nesterov, Lectures on Convex Optimization, 2 Ed., Springer, 2018, p. xii (Year: 2018).*

(Continued)

*Primary Examiner* — Scott C Anderson

(74) *Attorney, Agent, or Firm* — Joseph Zane; Brooks Kushman P.C.

(57) ABSTRACT

Automatic generation of optimized aggregation metrics for usage-based insurance (UBI) includes performing a high-dimensional Bayesian optimization on a data archive, the data archive including a plurality of signals from vehicles and corresponding UBI effects, wherein the high-dimensional Bayesian optimization includes performing testing on weighted groups of the plurality of signals using one or more aggregation functions; and transmitting the one or more aggregation functions to a vehicle to cause the vehicle to provide aggregated signals for input to a UBI model to predict a UBI rate for the vehicle.

19 Claims, 5 Drawing Sheets

(56) References Cited

U.S. PATENT DOCUMENTS

| | | | |
|---|---|---|---|
| 2022/0036466 A1 | 2/2022 | Harvey et al. | |
| 2023/0300579 A1 | 9/2023 | Merwaday et al. | |
| 2024/0043025 A1 | 2/2024 | Di Lillo et al. | |
| 2024/0119535 A1* | 4/2024 | Kloeppel | G06Q 30/0201 |

OTHER PUBLICATIONS

Vernade, "Bandit Learning with Delays in Non-Stationary Environments", https://www.youtube.com/watch?v=NyqalkZUfjs, Cluster of Excellence: Machine Learning: New Perspectives for Science, Oct. 18, 2021.
Grover et al., "Best Arm Identification in Multi-Armed Bandits with Delayed Feedback", Proceedings of the 21st International Conference on Artificial Intelligence and Statistics (AISTATS), 2018, 10 pages.
De Freitas Nando, "Machine learning—Bayesian optimization and multi-armed bandits", https://www.youtube.com/watch?v=vz3D36VXefl, Feb. 12, 2013.
Slivkins, Aleksandrs. "Introduction to Multi-Armed Bandits". Microsoft Research NYC. Apr. 2024. 188 pages.
Mahajan, Aditya et al. "Multi-Armed Bandit Problems". Foundations and Applications of Sensor Management. 70 pages.
De Freitas, Nando. "CPSC540 Bayesian optimization bandits and Thompson sampling". UBS Feb. 2013. 31 pages.
Bouneffouf, Djallel et al. "A Survey on Practical Applications of Multi-Armed and Contextual Bandits". IBM Thomas J. Watson Research Center, Yorktown Heights, NY USA. Apr. 2, 2019. 8 pages.

* cited by examiner

*300*

START

302

Construct Input-Output Pairs from
Obtained Data Archive

304

Formulate Acquisition Function

306

Evaluate UBI Model

308

Update Data Archive

310

Convergence?

NO

YES

312

Apply UBI Model /
Aggregation Functions

END

*400*

*500*

508 Network Device

512 Input Device

504 Processor

510 Output Device

506 Storage

Computing Device
502

AUTOMATIC GENERATION OF OPTIMIZED AGGREGATION METRICS FOR USAGE BASED INSURANCE

TECHNICAL FIELD

Aspects of the disclosure generally relate to automatic generation of optimized aggregation metrics for usage-based insurance (UBI).

BACKGROUND

Connected vehicles may send data to a cloud system. As the cloud system receives thousands of messages from millions of vehicles, this quantity of data may become large. UBI is a type of vehicle insurance whereby the premium cost is dependent on the driving behavior of a driver. A UBI device may be connected to a vehicle network via a connector such as an on-board diagnostic II (OBD-II) port to collect vehicle operating data and send the data to a remote server for analysis. In other examples, a telematics control unit (TCU) of the vehicle may collect the vehicle operating data and send the data to the remote server for analysis.

SUMMARY

In one or more illustrative examples, a method for automatic generation of optimized aggregation metrics for UBI includes performing a high-dimensional Bayesian optimization on a data archive, the data archive including a plurality of signals from vehicles and corresponding UBI effects, wherein the high-dimensional Bayesian optimization includes performing testing on weighted groups of the plurality of signals using one or more aggregation functions; and transmitting the one or more aggregation functions to a vehicle to cause the vehicle to provide aggregated signals for input to a UBI model to predict a UBI rate for the vehicle In one or more illustrative examples, a system for automatic generation of optimized aggregation metrics for UBI includes one or more computing devices configured to perform a high-dimensional Bayesian optimization on a data archive, the data archive including a plurality of signals from vehicles and corresponding UBI effects, wherein the high-dimensional Bayesian optimization includes performing testing on weighted groups of the plurality of signals using one or more aggregation functions; and transmit the one or more aggregation functions to a vehicle to cause the vehicle to provide aggregated signals for input to a UBI model to predict a UBI rate for the vehicle.

In one or more illustrative examples, a non-transitory computer-readable medium comprising instructions for automatic generation of optimized aggregation metrics for UBI that, when executed by one or more computing devices, cause the one or more computing devices to perform operations including to perform a high-dimensional Bayesian optimization on a data archive, the data archive including a plurality of signals from vehicles and corresponding UBI effects, wherein the high-dimensional Bayesian optimization includes performing testing on weighted groups of the plurality of signals using one or more aggregation functions, the high-dimensional Bayesian optimization includes to train a surrogate model using input-output pairs to approximate system behavior, formulate an acquisition function based on predictions of the surrogate model, the acquisition function being used to determine additional query points for the system behavior, optimize the acquisition function to obtain an input trigger, evaluate a UBI model, using the obtained input trigger to obtain an actual UBI-relatedness output associated with the input trigger, thereby creating a new input-output pair, and add the new input-output pair to the data archive for further iterations; and transmit the one or more aggregation functions to a vehicle to cause the vehicle to provide aggregated signals for input to the UBI model to predict a UBI rate for the vehicle.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Figure 1:
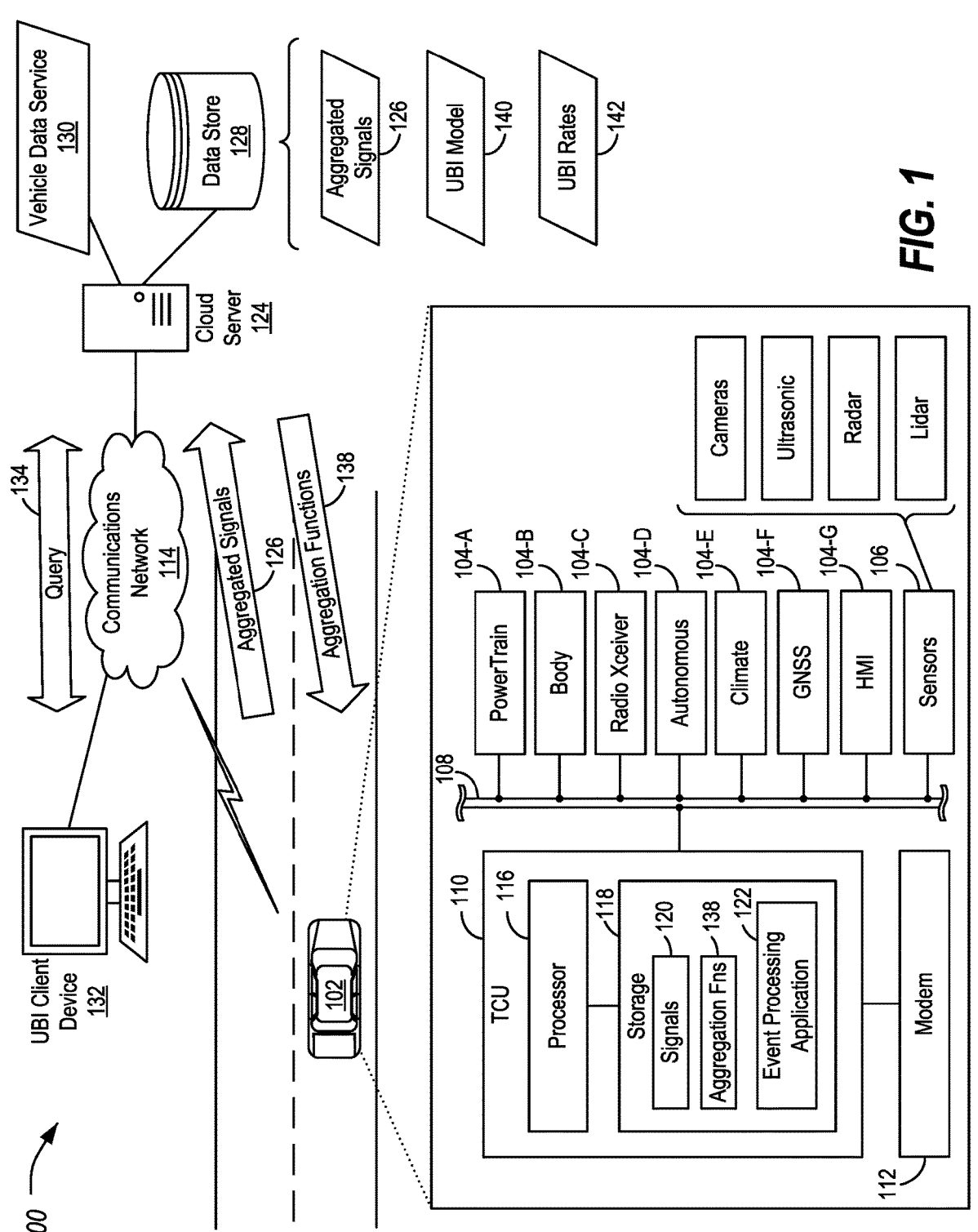
FIG. 1 illustrates an example system for performing data collection and analysis for pricing of UBI.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

UBI offers the potential to quote insurance products given varying driver behaviors. UBI quotes are based on signals captured by the vehicle. These signals are reflective of operation of the controllers of the vehicle, which accordingly is indicative of the driving behavior of the vehicle. Most of the signals that insurance companies use are primarily based on usage (e.g., miles driven) in combination with other controller signals that are readily available on the vehicle. A simple driver score metric may be defined based on the occurrence of various signal data multiplied by the distance traveled.

Using existing signals in this manner to compute the UBI metric is difficult for many reasons. First, the large amount of vehicle signal data is difficult to transmit and store. Second, aggregation of vehicle data into metrics can provide a poor and/or a noisy result. Third, metrics built for vehicle features other than UBI may be a poor indicator of driving quality, as the signals are designed for other purposes. Fourth, generating new aggregation metrics using human knowledge is difficult to test, poor to scale, and does not capture edge cases well. Fifth, there are low-level vehicle signals that may be affected by over the air updates/new vehicles, making hand building and maintaining of low level UBI models difficult under changing conditions.

An improved UBI approach may overcome these issues. The improved UBI approach determines an optimal set of aggregation metrics which are then deployed on customer vehicles to receive the most useful data to compute UBI metrics. Instead of using existing signals, optimization and/or machine learning techniques are used to discover an optimal set of aggregation metrics that correlate to a driver score. This may be accomplished based on a prediction of a machine learning (ML) model used to calculate the UBI effect of various signals. The ML model may be trained based on the optimized input aggregation metrics. The exploration and optimization of the input signals may be based on statistic modeling such as Bayesian optimization. Example ML models may include a neural network, a random forest, gradient boosted decision trees, etc.

The optimal set of aggregation metrics may be formed into aggregation metric triggers, which are delivered to and installed to the vehicle. These triggers may then be utilized by the vehicle to transmit the optimized aggregation of signals to a central server for calculating the driver UBI score. Further aspects of the disclosure are discussed in detail herein.

FIG. 1 illustrates an example system 100 for performing data collection for analysis and pricing of UBI. The system 100 includes one or more vehicles 102, where each vehicle 102 includes a plurality of controller 104 and sensors 106. Each vehicle 102 also includes one or more vehicle buses 108 for communication between the controller 104, sensors 106, and a TCU 110. The TCU 110 includes or otherwise has access to a modem 112 configured to facilitate communication over a communication network 114. The TCU 110 may include a processor 504 and a storage 506. The TCU 110 may capture signals 120 and maintain them in the storage 506. The storage 506 may also maintain an event processing application 122 configured to send, to the cloud server 124, aggregated signals 126 to be provided to the data store 128 of the cloud server 124 based on aggregation functions 138 provided to the vehicle 102 from the cloud server 124. The cloud server 124 may utilize a UBI model 140 to determine UBI rates 142 for the vehicles 102 based on the aggregated signals 126. This information may be provided to UBI client devices 132, in an example. It should be noted that the system 100 is only an example, and systems 100 with more, fewer, or different components may be used. In another example, the UBI model 140 may be executed by the vehicle 102, providing the UBI rate 142 from the vehicle 102 directly as opposed to from the cloud server 124.

The vehicle 102 may be any various types of automobile, crossover utility vehicle (CUV), sport utility vehicle (SUV), truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). Alternatively, the vehicle 102 may be an autonomous vehicle (AV). The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs). It should be noted that while automotive vehicles 102 are being used as examples of traffic participants, other types of traffic participants may additionally or alternately be used, such as bicycles, scooters, and pedestrians.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., controllers 104A through 104G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104A may be configured to provide control of engine operating components (e.g., idle control components, fuel delivery components, emissions control components, etc.) and for monitoring status of such engine operating components (e.g., status of engine codes); a body controller 104B may be configured to manage various power control functions such as exterior lighting, interior lighting, keyless entry, remote start, and point of access status verification (e.g., closure status of the hood, doors and/or trunk of the vehicle 102); a radio transceiver controller 104C may be configured to communicate with key fobs, mobile devices, or other local vehicle 102 devices; an autonomous controller 104D may be configured to provide commands to control the powertrain, steering, or other aspects of the vehicle 102; a climate control management controller 104E may be configured to provide control of heating and cooling system components (e.g., compressor clutch, blower fan, temperature sensors, etc.); a global navigation satellite system (GNSS) controller 104F may be configured to provide vehicle location information; and a human-machine interface (HMI) controller 104G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors 106 in order to receive information with respect to the surroundings of the vehicle 102. In an example, these sensors 106 may include one or more of cameras (e.g., advanced driver-assistance system (ADAS) cameras), ultrasonic sensors, radar systems, and/or lidar systems.

One or more vehicle buses 108 may include various methods of communication available between the vehicle controllers 104, as well as between the TCU 110 and the vehicle controllers 104. As some non-limiting examples, the vehicle bus 108 may include one or more of a vehicle controller area network (CAN), an Ethernet network, and a media-oriented system transfer (MOST) network.

The TCU 110 may include network hardware configured to facilitate communication between the vehicle controllers 104 and with other devices of the system 100. For example, the TCU 110 may include or otherwise access a modem 112 configured to facilitate communication over a communication network 114. The TCU 110 may, accordingly, be configured to communicate over various protocols, such as with the communication network 114 over a network protocol (such as Uu). The TCU 110 may, additionally, be configured to communicate over a broadcast peer-to-peer protocol (such as PC5), to facilitate cellular vehicle-to-everything (C-V2X) communications with devices such as other vehicles 102. It should be noted that these protocols are merely examples, and different peer-to-peer and/or cellular technologies may be used.

The TCU 110 may include various types of computing apparatus in support of performance of the functions of the TCU 110 described herein. In an example, the TCU 110 may include one or more processors 504 configured to execute computer instructions, and a storage 506 medium on which the computer-executable instructions and/or data may be maintained. A computer-readable storage medium (also referred to as a processor-readable medium or storage 506) includes any non-transitory (e.g., tangible) medium that participates in providing data (e.g., instructions) that may be read by a computer (e.g., by the processor(s)). In general, the processor 504 receives instructions and/or data, e.g., from the storage 506, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, etc.

The TCU 110 may be configured to include one or more interfaces from which information of the vehicle 102 may be sent and received. This information can be sensed, recorded, and sent to one or more cloud servers 124. In an example, similar to the TCU 110, the cloud server 124 may also include one or more processors (not shown) configured to execute computer instructions, and a storage medium (not shown) on which the computer-executable instructions and/or data may be maintained.

The TCU 110 may be configured to facilitate the collection of vehicle signals 120 from the vehicle controllers 104 connected to the one or more vehicle buses 108. While only a single vehicle bus 108 is illustrated, it should be noted that in many examples, multiple vehicle buses 108 are included, usually with a subset of the controllers 104 connected to each vehicle bus 108. Accordingly, to access a given controller 104, the TCU 110 may be configured to maintain a mapping of which vehicle buses 108 are connected to which controllers 104, and to access the corresponding vehicle bus 108 for a controller 104 when communication with that particular controller 104 is desired.

As used herein, vehicle signals 120 may refer to various binary, multi-state, integer, float, and/or continuous parameters that may be generated or otherwise raised by the vehicle controller 104 and/or sensors 106. As some non-limiting examples, the vehicle signals 120 may include one or more of: latitude, longitude, time, heading angle, speed, throttle position, brake status, steering angle, headlight status, wiper status, external temperature, turn signal status, ambient temperature or other weather conditions, alertness status, hands-off-wheel status, all-wheel drive (AWD) engaged status, front object detection, side object detection status, rear object detection status, etc.

The amount of vehicle signals 120 present on the vehicle 102 may be large and difficult to transmit and store. Thus, the TCU 110 may maintain aggregation functions 138 that create aggregated signals 126 based on a weighted collection of the vehicle signals 120. These aggregated signals 126 may be transmitted from the vehicle 102 to the cloud server 124. The aggregated signals 126 may include a subset of the individual signals 120 retrieved from the controllers 104 and/or the sensors 106 over the vehicle buses 108, weighted according to the aggregation function 138. In some cases, the aggregated signals 126 may further include contextual information, such as the current time, an identifier of the driver, location information from the GNSS controller 104F that may be used to augment the captured event information with locations of where the vehicle 102 was when the events occurred, etc.

The TCU 110 may be configured to transmit the aggregated signals 126 over the communication network 114 for reception by the cloud server 124. In an example, the management of sending aggregated signals 126 may be handled by an event processing application 122 executed by the TCU 110.

The collection of aggregated signals 126 may be performed in an event-based manner, in which the vehicles 102 send the aggregated signals 126 to the cloud server 124 responsive to occurrence of various aggregation function 138. For instance, when a condition of an aggregation function 138 is satisfied by the vehicle 102 (such as by a sharp impulse in an accelerometer signal), the aggregated signals 126 message may be sent from the modem 112 of the vehicle 102 to the cloud server 124, the message containing event information (loss magnitude, indicator type, etc.) as well as the GNSS coordinates at which the event occurred. Alternatively, the aggregated signals 126 can also be compiled from continuously sampled data from the vehicle buses 108, e.g., to the storage 506 of the TCU 110, which may allow for batch uploading of aggregated signals 126 from the vehicle 102. Following the collection of event information, the aggregated signals 126 may be sent to the cloud server 124 via the on-vehicle modem 112 (or in another example, via a cell phone connected to the vehicle 102).

The cloud server 124 may be configured to receive the aggregated signals 126 and store the aggregated signals 126 in a data store 128. This information may be maintained for processing by a vehicle data service 130.

As explained in detail herein, the vehicle data service 130 may be configured to generate updated aggregation functions 138, based on exploration and optimization of the input signals 120. This may be accomplished based on a UBI model 140 and/or statistic modeling, such as Bayesian optimization. The UBI model 140 may be used to calculate the insurance UBI effect and therefore determine a UBI rate 142 based on the signals 120 combined by aggregation functions 138 into the aggregated signals 126. The UBI model 140 be implemented as one or more a neural networks, random forests, gradient boosted decision trees, as some examples.

To construct the aggregation functions 138, the vehicle data service 130 may determine an optimal set of aggregation metrics for deployment to the vehicles 102. Instead of using existing aggregation metrics, optimization and/or machine learning techniques may be used to discover an optimal set of aggregation metrics that correlate to UBI effect based on the prediction of the UBI model 140 to price insurance products. The exploration and optimization of the input signals 120 may be based on a machine learning model and/or statistic modeling, such as Bayesian optimization. Based on the analysis, the vehicle data service 130 may provide the aggregation functions 138 to the vehicles 102. The aggregation functions 138 may be defined to collect an aggregation of the most informative signals 120 to be provided to the UBI model 140 of the cloud server 124.

The system 100 may further include one or more UBI client devices 132 configured to access the cloud server 124 over the communication network 114. Using the services of the vehicle data service 130 of the cloud server 124, one or more UBI client devices 132 may be configured to perform queries 134 of the aggregated signals 126 for various information, e.g., to access UBI rates 142 for the vehicles 102 for preparation of insurance quotes.

Figure 2:
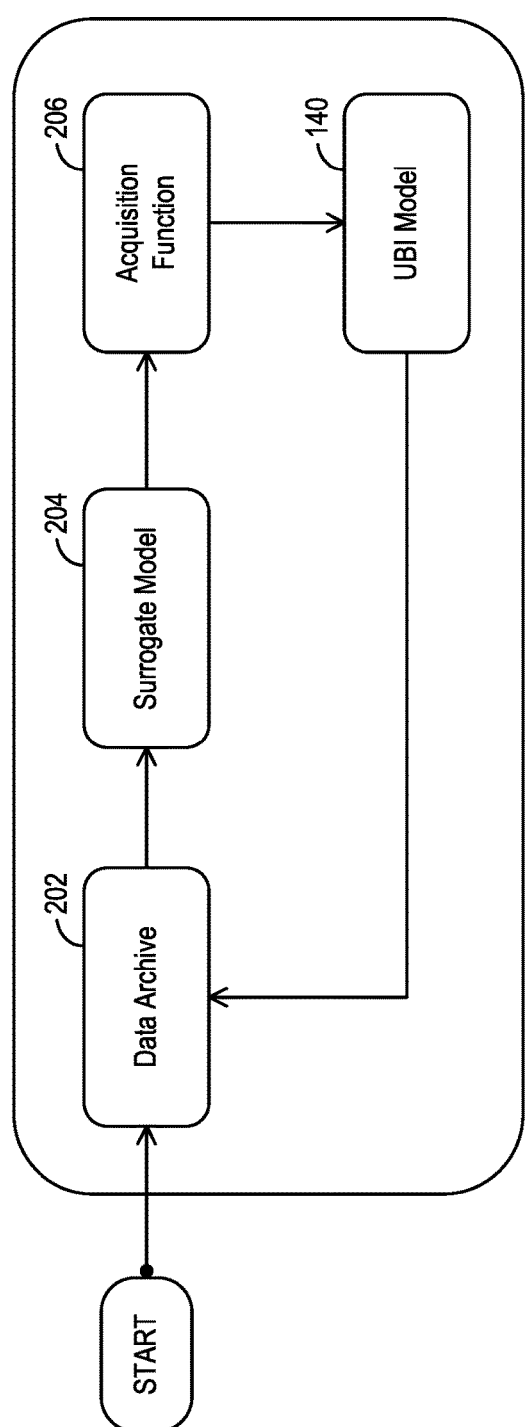
FIG. 2 illustrates an example Bayesian optimization framework used by the vehicle data service.

FIG. 2 illustrates an example Bayesian optimization framework 200 used by the vehicle data service 130. Bayesian optimization is a technique used for finding a global or optimum optimization of a black-box function F. As shown, the framework 200 includes a data archive 202, a surrogate model 204 (to model the black-box function), an acquisition function 206 to determine new data to acquire, and a UBI model 140 trained to model the function F.

The data archive 202 may include a data lake of various signals 120 retrieved from various vehicles 102. The data archive 202 may include an amount of high-fidelity full signal data and insurance claims, to optimize the aggregation function 138 and the UBI model 140. The high-fidelity signal data may be used to create an initial data set of input-output pairs. While the framework 200 may initially require such a data set, once optimized aggregation metrics and the UBI model 140 are developed, the UBI model 140 can be deployed on customer vehicles 102 to avoid large ongoing data collection costs.

The surrogate model 204 is used as a proxy or approximation of the true, high-fidelity system 100 or process. Here, the surrogate model 204 may define a black-box model of the objective function F. The black-box model refers to a system whose internal workings are unknown to the observer. The inputs to the model and the outputs from the model may be accessible, but the system lacks knowledge of how the model arrives at the outputs based on the inputs. The surrogate model 204 is trained on the available data, typically the initial data set of input-output pairs from the high-fidelity signal 120 data archive 202. The surrogate model 204 captures the underlying relationships in the data and provides predictions of the behavior. It is often chosen for its simplicity and computational efficiency. In the optimization process, the surrogate model 204 guides the search for the next optimal input by providing estimates of the system behavior and uncertainty.

The acquisition function 206 may be a function formulated using the output from the surrogate model 204. The acquisition function 206 may be optimized to achieve the expected global optima. Since the objective function F is unknown, the Bayesian strategy is to treat it as a random function and place a prior over it. The prior captures beliefs about the behavior of the function F. After gathering a set of function evaluations, which are treated as data, the prior is updated to form the posterior distribution over the objective function. The posterior distribution, in turn, is used to construct the acquisition function 206. The acquisition function 206 is used to determine the next query points. The acquisition function 206 may therefore be a way to efficiently explore and exploit the variable space by combining mean and uncertainty estimates from the surrogate model 204.

The UBI model 140 is specifically designed to assess the UBI effect associated with different system configurations or inputs. It is trained on high-fidelity function evaluations obtained by evaluating the actual UBI-relatedness associated with various inputs, typically using the system's UBI model 140. The UBI model 140 is expected to capture the complex and nuanced relationships between inputs and actual UBI-relatedness outcomes. During the optimization process, the UBI model 140 is used to obtain the actual UBI-relatedness output associated with the chosen aggregation function 138 or input. It serves as the ground truth for evaluating the performance of aggregation functions 138. The UBI model 140 may take various forms such as a random forest, xgboost, etc.

The surrogate model 204 acts as a computationally efficient approximation of the behavior and guides the optimization process by providing predictions. On the other hand, the UBI model 140 is a more detailed model focused on accurately assessing the UBI-relatedness associated with different inputs. The UBI model 140 evaluations may be used to validate and improve the surrogate model 204 over iterations. Both models play complementary roles in the Bayesian optimization process, with the surrogate model 204 guiding the search, and the UBI model 140 providing the true UBI-relatedness assessments for evaluation.

The search space of the Bayesian optimization may be large. For example, the search space may be described as:

$$\text{(signal\_list * Transformation/Aggregation Function)} \qquad (1)$$

Due to this size, it may be desirable to reduce the number of signals 120 that are retrieved from the vehicles 102. This may be accomplished by using the aggregation functions 138 that are deployed on the vehicle 102 to combine multiple signals 120 into one unique and optimized aggregated signal 126. This approach may be represented as a factorial search space as follows:

$$\text{factorial(weight * signal\_list * Transformation/Aggregation} \qquad (2)$$
$$\text{Function)}$$

The search space may be reduced using various methods as well as engineering knowledge. For example, input descriptive of importance of each signal 120 may be accounted for to indicate that a signal 120 (such as time to collision) may be more valuable than another signal 120 (such as window height status).

One approach may be formulated as follows:

$$\max F \ (w_1 S_1, w_2 S_2, \ldots, w_M S_M) \qquad (3)$$
such that:
$$0 \le w_1, w_2, \ldots, w_M \le 1,$$
where:
$S_1, S_2, \ldots, S_M$ are M signals 120 to be evaluated;
$w_1, w_2, \ldots, w_M$ are weights applied to each signal 120, M, varying between [0, 1];
F is a UBI model 140 used for predicting UBI effect; and
max is a function used to identify an aggregation metric that maximizes the possible UBI effect This optimization problem may be solved using the Bayesian optimization. For purposes of the Bayesian optimization framework 200, the surrogate model 204 is an objective function, e.g., the continuous function F as shown in Equation (3). Using the framework 200, a closed-loop iterative optimization may be performed assisted by the surrogate model 204 to efficiently find global optima in the function F.

In computing the final aggregation metric, if a weight w<=threshold value, then that signal 120 can be ignored in the metric. By using a minimum threshold, the framework 200 allows the total number of signals 120 to be reduced to those that are shown to be the most relevant.

Various approaches are available to formulate the acquisition function 206. The acquisition function 206 may often be based on the uncertainty of the surrogate model 204 predictions. Common acquisition functions 206 may include Probability of Improvement (PI), Expected Improvement (EI), or Upper Confidence Bound (UCB).

To use an example approach of EI, this may be formulated as follows:

$$EI(x) = (\mu - f(x^*))\Phi\ ((\mu - f(x^*))/s) + s\phi\ ((\mu - f(x^*))/s) \quad (4)$$

where:

the first term focuses on exploiting the known best region in the design space, and the second term focuses more on the uncertainly estimation from the surrogate model 204, thus exploring the area having low confidence.

Accordingly, the acquisition function 206 may be optimized to find the input that maximizes the expected improvement or another suitable criterion. This new input will be used for further cycles of evaluation. Moreover, the aggregation functions 138 may be optimized to incorporate those signals 120 that are most relevant to the operation of the UBI model 140, thereby reducing the data transfer that is required from the vehicle 102, while at the same time increasing the reliability of the UBI scoring.

Figure 3:
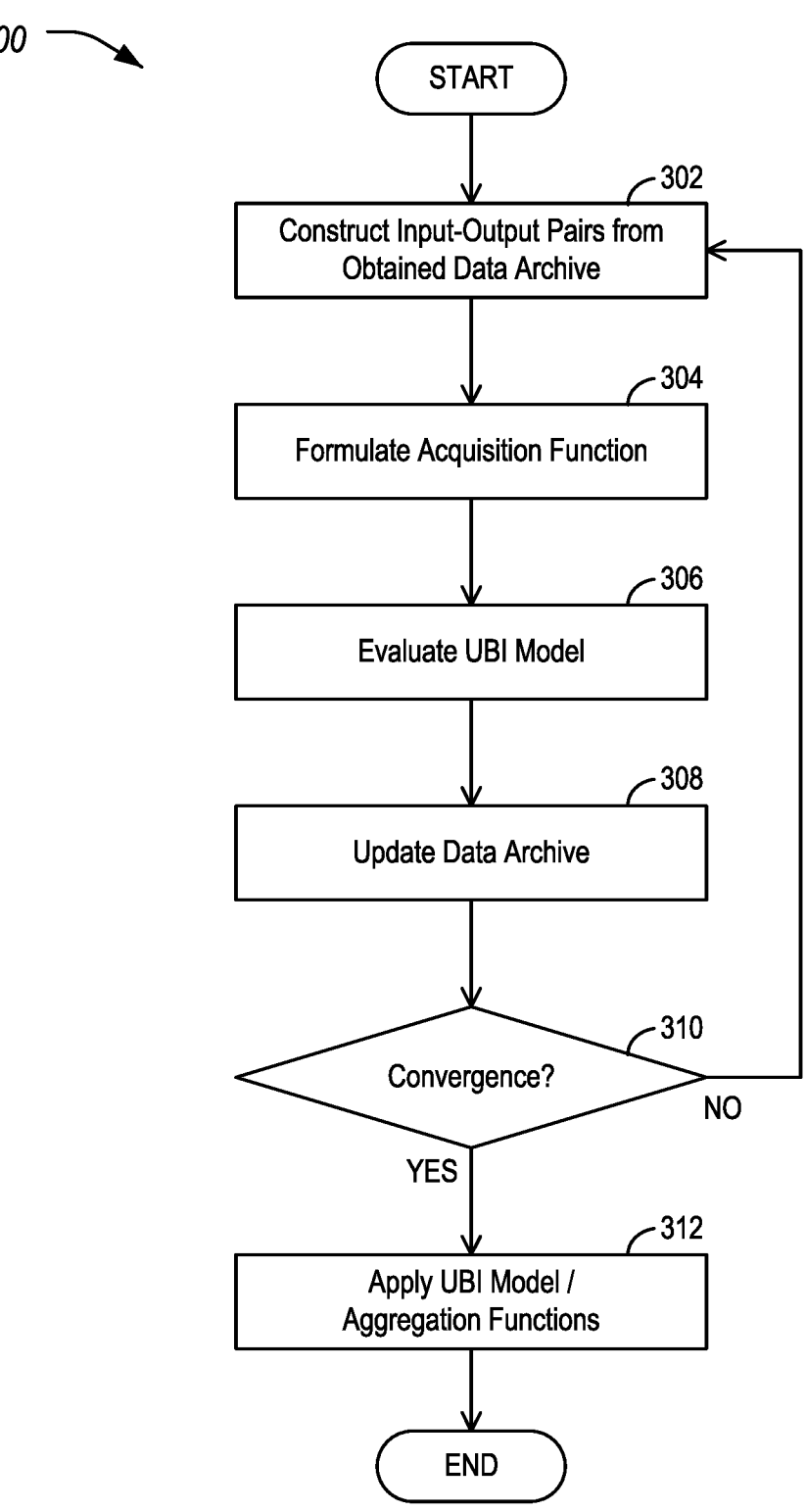
FIG. 3 illustrates an example process for training a machine learning model and for determining the aggregation functions for deployment to vehicles.

FIG. 3 illustrates an example process 300 for training the UBI model 140 and for determining the aggregation functions 138 for deployment to vehicles 102. In an example, the aggregation functions 138 may define a collection of one or more signals 120 to be provided to the cloud servers 124 for use in determining UBI rates 142.

At operation 302, the vehicle data service 130 constructs an initial data set of input-output pairs based on the data archive 202. In an example the data archive 202 may be obtained based on high-fidelity signal 120 data captured from various vehicles 102 over time. Using the data archive 202, construct an initial data set of input-output pairs based on the data archive 202. The vehicle data service 130 may train a surrogate model 204 using the input-output pairs to approximate system behavior.

At operation 304, the vehicle data service 130 formulates an acquisition function 206. The acquisition function 206 may be formulated based on predictions of the surrogate model 204, and may be used to determine additional query points for the system behavior. The acquisition function 206 may be based on uncertainty in surrogate model 204 predictions. In an example, the acquisition function 206 may be configured to maximize EI such as shown in equation (4).

The acquisition function 206 may involve one or more aggregation functions 138. Each of the one or more aggregation functions 138 may applies respective weights to each of the plurality of signals 120 available from the vehicle 102, where each respective weight is descriptive of a relative importance of the respective signal 120 to the system behavior. An example weight formulation is shown in equation (3). The vehicle data service 130 may optimize the acquisition function 206 to obtain an input trigger.

At operation 306, the vehicle data service 130 evaluates the UBI model 140. Using the obtained input trigger from operation 306, the vehicle data service 130 may obtain an actual UBI-relatedness output associated with the input trigger, thereby creating a new input-output pair.

At operation 308, the vehicle data service 130 updates the data archive 202. This may include adding the new input-output pair to the data archive 202 for further iterations.

At operation 310, the vehicle data service 130 determines whether convergence is achieved by the UBI model 140. If convergence has been achieved, control proceeds to operation 314. If not, control returns to operation 302.

In another example, the vehicle data service 130 may additionally or alternately determine whether a training budget in terms of time or computing resources has been exhausted. If so, control proceeds to operation 312. If not, control returns to operation 302.

At operation 312, the vehicle data service 130 applies the aggregation functions 138 to the vehicles 102 for use by the UBI model 140. In an example, the cloud server 124 may send the aggregation functions 138 to the vehicles 102 over the communication network 114, to be maintained to the storage 506 and executed by the processor 504 of the TCUs 110 on the signals 120 of the vehicles 102. After operation 314, the process 300 ends.

It should be noted that while the process 300 is shown as discrete operations, these operations may be combined and/ or separated and/or executed concurrently or in alternate orderings. It should also be noted that the execution of the process 300 may be performed periodically, iteratively, responsive to receipt of aggregated signals 126, etc.

Figure 4:
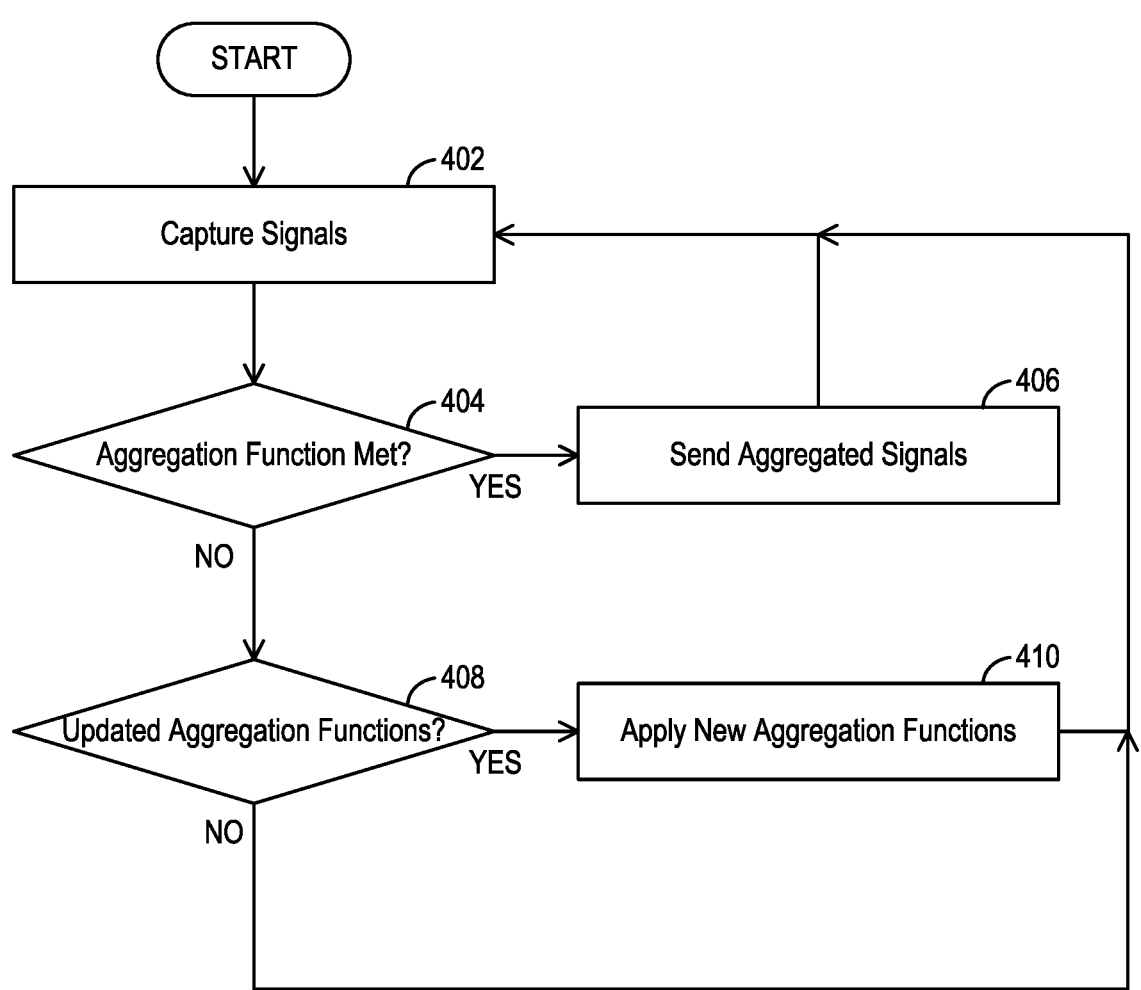
FIG. 4 illustrates an example process for the operation of the vehicle in providing data for prediction of UBI rates, based on the triggers determined according to the process.

FIG. 4 illustrates an example process 400 for the operation of the vehicle 102 in providing data for prediction of UBI rates 142, based on the aggregation functions 138 determined according to the process 300.

At operation 402, the vehicle 102 captures signals 120 according to the aggregation functions 138. These signals 120 may be received to the TCU 110 from the controllers 104 and/or the sensor 106 via the vehicle buses 108 of the vehicle 102.

At operation 404, the vehicle 102 determines whether the aggregation function 138 is met. For instance, if the aggregation function 138 requires signals 120 that have been by the vehicle 102, control passes to operation 406. Otherwise, control continues to operation 408.

At operation 406, the vehicle 102 sends aggregated signals 126 to the cloud server 124. In an example, the aggregated signals 126 may include an aggregation of signals 120 for use in providing features to the UBI model 140 for analysis. After operation 406, control returns to operation 402.

At operation 408, the vehicle 102 determines whether updated aggregation functions 138 have been received. In an example, the TCU 110 of the vehicle 102 may receive updated aggregation functions 138 from the cloud server 124 based on training of the UBI model 140 by the cloud server 124. If so, control passes to operation 410.

At operation 410, the vehicle 102 applies the new aggregation functions 138 for use in sending aggregated signals 126. In an example, the new aggregation functions 138 are stored to the storage 506 and used for later analysis of the signals 120 to construct aggregated signals 126 to send to the cloud server 124. After operation 410, the process 400 returns to operation 402.

Variations on the disclosed approaches may be used. For instance, the system 100 may be configured to account for differences in the available signals 120 across different makes, models, trims, features, software versions, etc. of the vehicles 102. To do so, a signal mapping may be defined that maps disparate signals across different vehicles 102 into a consistent interface for use by the UBI model 140 and/or the aggregation functions 138. For instance, one vehicle 102 may raise a door_fr signal for opening a door while another vehicle 102 may show a doorStatus change for opening of the same door. In such an example, the training may be performed using the signals 120 mapped into the consistent interface for either action, e.g., DoorChange. Then, when the aggregation functions 138 are deployed, the consistent interface can be mapped back to the specific signals 102 of the different models of vehicles 102. In one approach, the aggregation functions 138 are applied to the vehicles 102 using the consistent interface, and where vehicle 102 uses its own mapping between the consistent interface of the UBI model 140 and the specific signals 120 of the vehicle 102. In another approach, the aggregation functions 138 are customed to the specific vehicles 102 and then applied to the vehicles 102.

As another variation, additional aggregation functions 138 may be deployed for the purpose of exploration. This may be used, for example, to aid in validating the UBI model 140. For instance, if there are cases where the uncertainty of the UBI model 140 is high, additional aggregation functions 138 may be deployed to further train the UBI model 140 to handle these cases. Additionally, or alternatively, additional aggregation functions 138 may be deployed to identify potential cause and effect relationships. This may be useful, for example, to quantify effects of over the air updates (e.g., version A and version B of ECU software may affect signals 120 which may have effects on vehicle 102 operation and driving outcomes).

As yet another variation, a rolling buffer memory may be used to store signals 120 of the vehicle 102 (e.g., a whitelisted list of signals 120 of interest) whereupon based on occurrence of events of interest (e.g., over a predefined period of time before the event), this rolling buffer or signals 102 may be sent from the vehicle 102 to the cloud server 124 for analysis and to improve the training of the UBI model 140. This may also be useful in instances where the UBI model 140 did not predict a likelihood of a claim, but a claim was evident in the time corresponding to the rolling buffer data.

Figure 5:
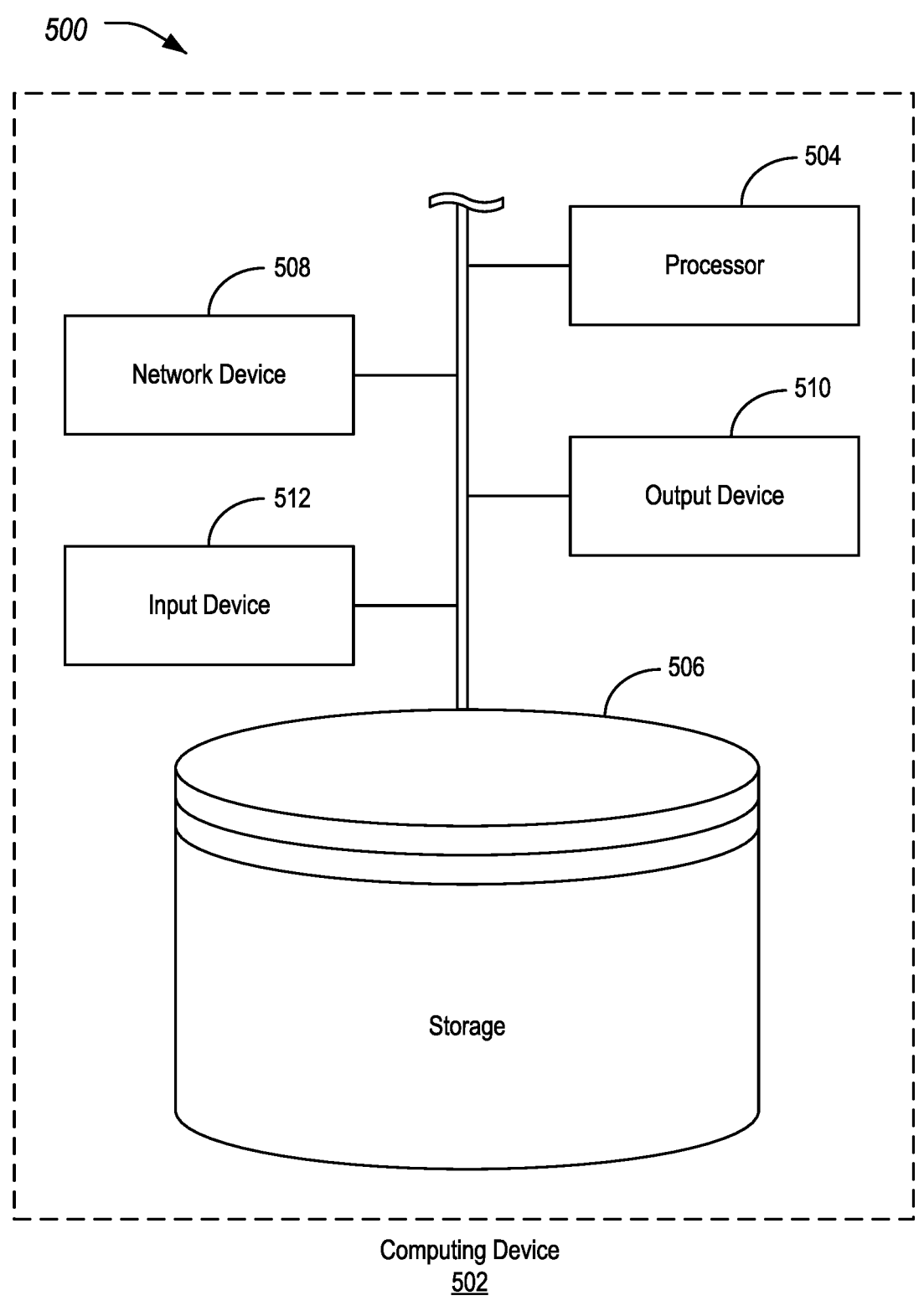
FIG. 5 illustrates an example computing device for performing data collection and analysis for pricing of UBI.

FIG. 5 illustrates an example computing device 502 for performing data collection and analysis for pricing of UBI. Referring to FIG. 5, and with reference to FIGS. 1-4, the vehicle 102, controllers 104, sensors 106, TCU 110, and cloud server 124 may be examples of such computing devices 502. Computing devices 502 generally include computer-executable instructions, where the instructions may be executable by one or more computing devices 502. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as signals 120, aggregated signals 126, aggregation functions 138, and UBI rates 142, etc., may be stored and transmitted using a variety of computer-readable media.

As shown, the computing device 502 may include a processor 504 that is operatively connected to a storage 506, a network device 508, an output device 510, and an input device 512. It should be noted that this is merely an example, and computing devices 502 with more, fewer, or different components may be used.

The processor 504 may include one or more integrated circuits that implement the functionality of a central processing unit (CPU) and/or graphics processing unit (GPU). In some examples, the processors 504 are a system on a chip (SoC) that integrates the functionality of the CPU and GPU.

The SoC may optionally include other components such as, for example, the storage 506 and the network device 508 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 504 executes stored program instructions that are retrieved from the storage 506. The stored program instructions, accordingly, include software that controls the operation of the processors 504 to perform the operations described herein. The storage 506 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 510. The output device 510 may include a graphical or visual display device, such as an electronic display screen, projector, printer, or any other suitable device that reproduces a graphical display. As another example, the output device 510 may include an audio device, such as a loudspeaker or headphone. As yet a further example, the output device 510 may include a tactile device, such as a mechanically raiseable device that may, in an example, be configured to display braille or another physical output that may be touched to provide information to a user.

The input device 512 may include any of various devices that enable the computing device 502 to receive control input from users. Examples of suitable input devices 512 that receive human interface inputs may include keyboards, mice, trackballs, touchscreens, microphones, graphics tablets, and the like.

The network devices 508 may each include any of various devices that enable the described components to send and/or receive data from external devices over networks. Examples of suitable network devices 508 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for automatic generation of optimized aggregation metrics for usage-based insurance (UBI), comprising:
  performing a multi-dimensional Bayesian optimization on a data archive, the data archive including a plurality of signals from vehicles and corresponding UBI effects, wherein the multi-dimensional Bayesian optimization includes performing testing on weighted groups of the plurality of signals using one or more aggregation functions, wherein the multi-dimensional Bayesian optimization is repeated until a convergence criterion is met and/or until an iteration budget is exhausted;
  transmitting the one or more aggregation functions to a vehicle for execution by an on-vehicle processor of the vehicle, to cause the vehicle to provide aggregated signals generated from the plurality of signals without providing the plurality of signals, the aggregated signals being for input to a UBI model to predict a UBI rate for the vehicle;

receiving the aggregated signals from the vehicle, thereby reducing data transfer from the vehicle as compared to the vehicle providing the plurality of signals;
  adding the aggregated signals to the data archive to update the data archive; and
  repeating performing the multi-dimensional Bayesian optimization and the transmitting of the one or more aggregation functions to the vehicle based on the data archive as updated.

2. The method of claim 1, wherein the multi-dimensional Bayesian optimization includes:
  training a surrogate model using input-output pairs to approximate system behavior;
  formulating an acquisition function based on predictions of the surrogate model, the acquisition function being used to determine additional query points for the system behavior;
  optimizing the acquisition function to obtain an input trigger;
  evaluating the UBI model, using the obtained input trigger to obtain an actual UBI-relatedness output associated with the input trigger, thereby creating a new input-output pair; and
  adding the new input-output pair to the data archive for further iterations.

3. The method of claim 2, wherein the acquisition function is based on mean and uncertainty from surrogate model predictions and is configured to maximize expected improvement.

4. The method of claim 1, wherein each of the one or more aggregation functions applies respective weights to each of the plurality of signals available from the vehicle, each respective weight being descriptive of a relative importance of a respective one of the plurality of signals to system behavior.

5. The method of claim 1, wherein weights below a threshold value are set to zero to excluded those of the plurality of signals, thereby reducing search space for the multi-dimensional Bayesian optimization and quantity of the aggregation functions.

6. The method of claim 1, further comprising:
  receiving the aggregated signals from the vehicle based on the one or more aggregation functions; and
  utilizing the aggregated signals to predict the UBI rate for the vehicle.

7. A system for automatic generation of optimized aggregation metrics for UBI, comprising:
  a data archive including a plurality of signals from vehicles and corresponding UBI effects; and
  one or more computing devices configured to:
    perform a multi-dimensional Bayesian optimization on the data archive, wherein the multi-dimensional Bayesian optimization includes performing testing on weighted groups of the plurality of signals using one or more aggregation functions, wherein the multi-dimensional Bayesian optimization is repeated until a convergence criterion is met and/or until an iteration budget is exhausted;
    transmit the one or more aggregation functions to a vehicle for execution by an on-vehicle processor of the vehicle, to cause the vehicle to provide aggregated signals generated from the plurality of signals without providing the plurality of signals, the aggregated signals being for input to a UBI model to predict a UBI rate for the vehicle;

receive the aggregated signals from the vehicle, thereby reducing data transfer from the vehicle as compared to the vehicle providing the plurality of signals;

add the aggregated signals to the data archive to update the data archive; and repeat performing the multi-dimensional Bayesian optimization and the transmit of the one or more aggregation functions to the vehicle based on the data archive as updated.

8. The system of claim 7, wherein the multi-dimensional Bayesian optimization includes to:

train a surrogate model using input-output pairs to approximate system behavior;

formulate an acquisition function based on predictions of the surrogate model, the acquisition function being used to determine additional query points for the system behavior;

optimize the acquisition function to obtain an input trigger;

evaluate the UBI model, using the obtained input trigger to obtain an actual UBI-relatedness output associated with the input trigger, thereby creating a new input-output pair; and add the new input-output pair to the data archive for further iterations.

9. The system of claim 8, wherein the acquisition function is based on mean and uncertainty from surrogate model predictions and is configured to maximize expected improvement.

10. The system of claim 7, wherein each of the one or more aggregation functions applies respective weights to each of the plurality of signals available from the vehicle, each respective weight being descriptive of a relative importance of a respective one of the plurality of signals to system behavior.

11. The system of claim 7, wherein weights below a threshold value are set to zero to excluded those of the plurality of signals, thereby reducing search space for the multi-dimensional Bayesian optimization and quantity of the aggregation functions.

12. The system of claim 7, wherein the one or more computing devices are further configured to:

receive the aggregated signals from the vehicle based on the one or more aggregation functions; and utilize the aggregated signals to predict the UBI rate for the vehicle.

13. The system of claim 7, wherein the one or more computing devices include a cloud server, and further comprising the vehicle, wherein the vehicle includes one or more controllers configured to:

aggregate the plurality of signals according to the one or more aggregation functions to generate the aggregated signals; and send the aggregated signals to the cloud server without providing the plurality of signals to the cloud server.

14. The system of claim 13, wherein the one or more controllers of the vehicle are further configured to:

receive updated aggregation functions from the cloud server based on training of the UBI model by the cloud server; and aggregate the plurality of signals according to the updated aggregation functions to generate additional aggregated signals; and send the additional aggregated signals to the cloud server.

15. A non-transitory computer-readable medium comprising instructions for automatic generation of optimized aggregation metrics for UBI that, when executed by one or more computing devices, cause the one or more computing devices to perform operations including to:

perform a multi-dimensional Bayesian optimization on a data archive, the data archive including a plurality of signals from vehicles and corresponding UBI effects, wherein the multi-dimensional Bayesian optimization includes performing testing on weighted groups of the plurality of signals using one or more aggregation functions, wherein the multi-dimensional Bayesian optimization is repeated until a convergence criterion is met and/or until an iteration budget is exhausted, wherein the multi-dimensional Bayesian optimization includes to:

train a surrogate model using input-output pairs to approximate system behavior, formulate an acquisition function based on predictions of the surrogate model, the acquisition function being used to determine additional query points for the system behavior, optimize the acquisition function to obtain an input trigger, evaluate a UBI model, using the obtained input trigger to obtain an actual UBI-relatedness output associated with the input trigger, thereby creating a new input-output pair, and add the new input-output pair to the data archive for further iterations;

transmit the one or more aggregation functions to a vehicle for execution by an on-vehicle processor of the vehicle, to cause the vehicle to provide aggregated signals generated from the plurality of signals without providing the plurality of signals, the aggregated signals being for input to the UBI model to predict a UBI rate for the vehicle;

receive the aggregated signals from the vehicle, thereby reducing data transfer from the vehicle as compared to the vehicle providing the plurality of signals;

add the aggregated signals to the data archive to update the data archive; and repeat performing the multi-dimensional Bayesian optimization and the transmit of the one or more aggregation functions to the vehicle based on the data archive as updated.

16. The non-transitory computer-readable medium of claim 15, wherein the acquisition function is based on mean and uncertainty from surrogate model predictions and is configured to maximize expected improvement.

17. The non-transitory computer-readable medium of claim 15, wherein each of the one or more aggregation functions applies respective weights to each of the plurality of signals available from the vehicle, each respective weight being descriptive of a relative importance of a respective one of the plurality of signals to system behavior.

18. The non-transitory computer-readable medium of claim 15, wherein weights below a threshold value are set to zero to excluded those of the plurality of signals, thereby reducing search space for the multi-dimensional Bayesian optimization and quantity of the aggregation functions.

19. The non-transitory computer-readable medium of claim 15, further comprising instructions that, when executed by the one or more computing devices, cause the one or more computing devices to perform operations including to:

receive the aggregated signals from the vehicle based on the one or more aggregation functions; and utilize the aggregated signals to predict the UBI rate for the vehicle.

* * * * *